A. N. RING.
ATTACHMENT FOR PLOWS.
APPLICATION FILED NOV. 10, 1914.
1,181,480.
Patented May 2, 1916.
2 SHEETS—SHEET 1.
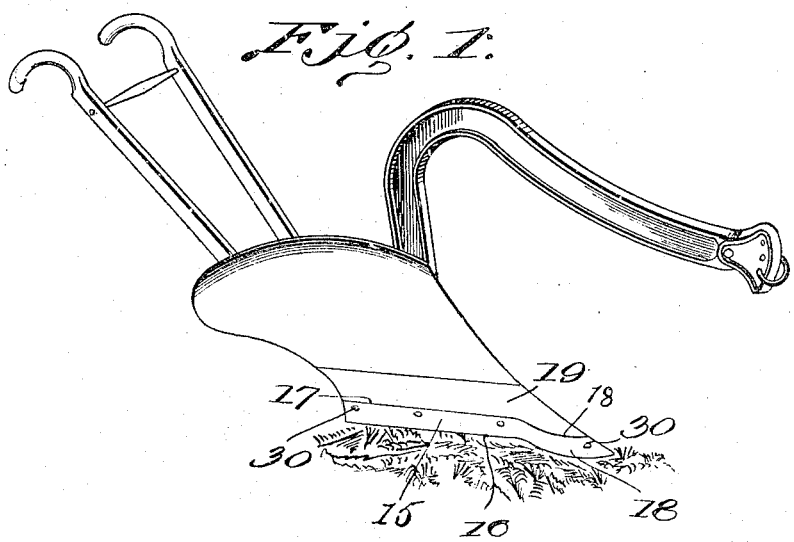
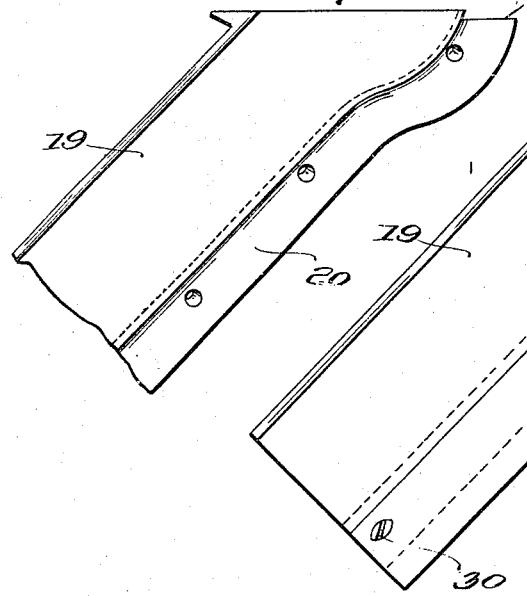
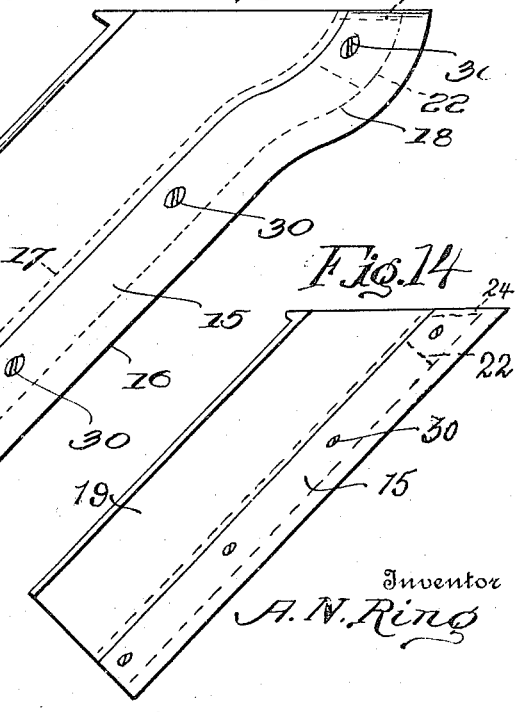
Witnesses
C. N. Woodward
Inventor
A. N. Ring
By
Attorney

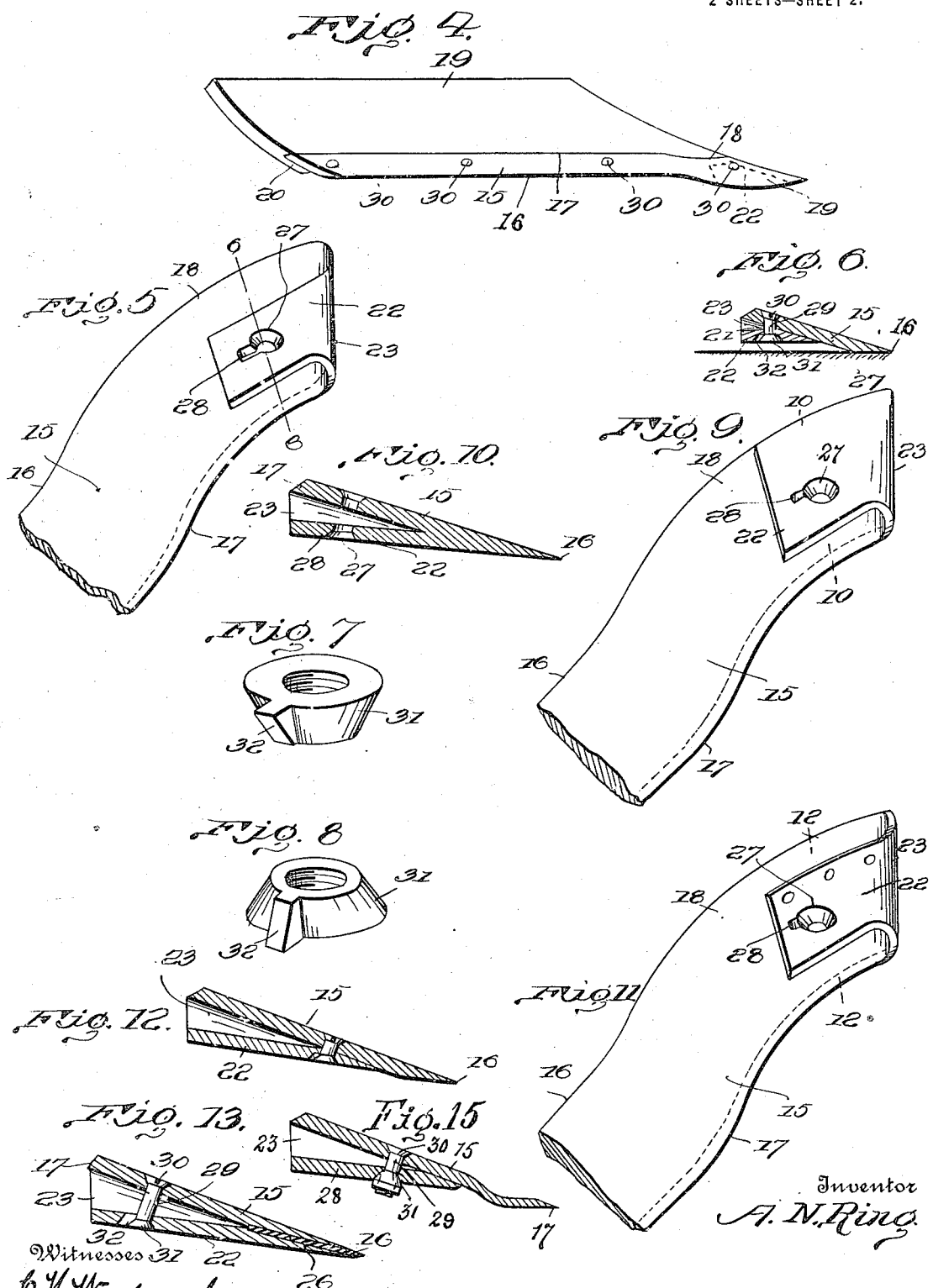

UNITED STATES PATENT OFFICE.

ALBERT N. RING, OF BUHL, IDAHO.

ATTACHMENT FOR PLOWS.

1,181,480.      Specification of Letters Patent.      Patented May 2, 1916.

Application filed November 10, 1914. Serial No. 871,296.

*To all whom it may concern:*

Be it known that I, ALBERT N. RING, a citizen of the United States, residing at Buhl, in the county of Twin Falls and State of Idaho, have invented certain new and useful Improvements in Attachments for Plows, of which the following is a specification.

This invention relates to improvements in plows, more particularly to the share portion of a plow, and has for one of its objects to provide a simply constructed attachment having a cutting edge which may be applied to a plow share and readily removed for resharpening or for renewing the impaired or broken attachment.

Another object of the invention is to provide a simply constructed device which may be readily attached without material structural change to plows of various makes and forms.

With these and other objects in view the invention consists in certain novel features of construction as hereinafter shown and described and then specifically pointed out in the claims; and in the drawings illustrative of the preferred embodiment of the invention.

Figure 1 is a perspective view of a conventional plow with the improvement applied. Fig. 2 is an enlarged detached detail view of the share portion of the plow with the improvement applied. Fig. 3 is a plan view of a portion of the share with the improved attachment applied. Fig. 4 is a perspective view of the portion shown in Fig. 2. Fig. 5 is an enlarged perspective view from beneath of the improved attachment including the socket portion. Fig. 6 is a transverse section on the line 6—6 of Fig. 5. Fig. 7 is an enlarged perspective view from above of the under portion of the fastening device. Fig. 8 is a perspective view from beneath of the under portion of the fastening device. Fig. 9 is a view similar to Fig. 5 illustrating a modification in the construction. Fig. 10 is a section on the line 10—10 of Fig. 9. Fig. 11 is a view similar to Figs. 5 and 9 illustrating another modification in the construction. Fig. 12 is a section on the line 12—12 of Fig. 11. Fig. 13 is an enlarged sectional detail illustrating another modification in the construction. Fig. 14 is a view similar to Fig. 2, on a reduced scale illustrating a modification in the construction. Fig. 15 is a view similar to Fig. 12, illustrating another modification in the construction.

Corresponding and like parts are referred to in the following description and indicated in all the views of the accompanying drawings by the same reference characters.

The improved device comprises a plate or body portion 15 having a cutting forward edge 16 and a beveled rear edge 17, and preferably curving forwardly at one end as illustrated at 18 to conform to the outline of the nose portion of a plow share, the cutting edge 16 following the curvature, as shown in Fig. 2. The plow share is represented as a whole at 19 and is formed with its upper portion cut away, as shown at 20, to form a seat to receive the body portion 15—18 of the attachment and with the rear side of the cut away portion cut under or recessed to receive the beveled edge 17 of the attachment. When applied to the share the upper face of the attachment will thus come flush with the upper face of the share, the two faces merging into each other without obstruction.

The body portion of the member 15 is preferably bolted to the moldboard, as indicated at 30, the apertures for the bolt in the attachment being countersunk and the head of the bolt being tapered to correspond to the countersunk apertures, so that no portion of the bolt projects beyond the outer face of the attachment.

The curved terminal 18 of the attachment is extended and the extended portion bent over the portion 18 of the attachment, as illustrated at 22, and forming a socket with its outer end 23 closed to engage over the nose portion of the plow share, the share landside being recessed as illustrated at 24 in Fig. 3 to receive the closed end 23 of the socket, so that no portion of the attachment or its socket projects beyond the share landside, as illustrated in Fig. 2. By this means, no obstruction occurs to retard the action of the plow. The closed terminal 23 of the socket thus receives the greater portion of the end thrust of the attachment, and protects the bolts from sheering strains. One of the countersunk apertures will be formed in the body portion in position to register with a similar countersunk aperture in the turned over portion 22 of the socket, and with another aperture in the turned over portion. The aperture in the portion 22 is shown at 27 in Fig. 5 and is formed with a lateral recess 28.

The bolt for securing the attachment to the nose portion of the share is represented at 29 and provided with a tapered head 30 to engage in the aperture in the attachment and with a tapered nut 31 to engage in the aperture of the folded under portion 22, and with a wing 32 to engage in the recess 28. By this means the nut is prevented from rotating, while at the same time no portion of the nut projects below the turned over portion 22 of the socket. The rear edge of the bent over portion 22 of the socket may be connected in any suitable manner to the portion 18 of the attachment, for instance by bolting, as illustrated in Figs. 2 and 6, welding, as shown in Figs. 9 and 10, or riveting, as shown in Figs. 11 and 12. The folded over portion of the socket may likewise be welded, as illustrated in Fig. 13, with a sheet of metal 26 interposed within the welded portion, as illustrated, to strengthen and stiffen the cutting edge of the socket.

For the lighter class of plows, the turned over portion 22 of the socket may be secured by a holding bolt only, but for the heavier grades of plows, or for plows employed in heavy or stony grounds, the turned over portion should be welded or riveted, and the bolt utilized only to hold the attachment to the share.

By employing the tapered nut fitting in the countersunk aperture so that the outer face comes flush with the lower face of the turned over portion 22 of the socket, no obstruction is presented to interfere with the action of the plow, or to prevent it from "scouring." This is an important feature of applicant's device and materially increases its efficiency and utility.

With a device thus constructed, in event of the cutting edge becoming dull or otherwise impaired, it can be readily detached for resharpening, or to apply a new attachment. A plurality of the attachments will preferably be furnished to each plow, so that in event of the breakage or impairment of the attachment, it can be quickly renewed by any person without previous skill or knowledge and thus obviate the necessity for taking the plow to the blacksmith's shop to have the share sharpened.

The heads 30 of the bolts 29 will preferably be provided with screw driver receiving sockets to enable the bolts to be rotated in the nuts, or the nuts may be formed with a wrench receiving projection as shown in Fig. 15.

When the improved attachment is employed upon plow shares not having the curved portion 18, the attachment will be formed straight from end to end as illustrated in Fig. 14.

When employed in some kinds of soil, the attachment may be formed with a slight "drop" or depression, extending longitudinally of the attachment, as illustrated in Fig. 15. By this arrangement the attachment will have greater wear or friction, and drag on the bottom of the furrow, which while it would increase the draft, would likewise improve the "scouring action."

Having thus described the invention, what is claimed as new is:

1. An attachment for plows comprising a member having a cutting edge and a longitudinally directed extension at one end, said extension being folded beneath the body of the member attached thereto at its forward edge and spaced from the member at its rear edge to form a socket adapted to receive the forward edge of a plow share.

2. In a plow, a share reduced at the forward edge to form a seat and with an undercut stop shoulder at the rear side of the seat, and an attachment comprising a member engaging said seat and bearing against said stop shoulder, said member having a longitudinally directed extension foldable beneath the body of the member and attached thereto at its forward edge and spaced from the member at its rear edge to form a socket adapted to receive the forward edge of said plow share.

3. In a plow, a share reduced at the forward edge to form a seat and with an undercut stop shoulder at the rear side of the seat, an attachment comprising a member engaging said seat and bearing against said stop shoulder, said member having a longitudinally directed extension foldable beneath the body of the member and attached thereto at its forward edge and spaced from the member at its rear edge to form a socket adapted to receive the forward edge of said plow share, and a fastening device operating through the member and the folded underportion thereof and likewise through the share.

In testimony whereof I affix my signature in presence of two witnesses.

ALBERT N. RING.

Witnesses:
 Russ W. Allred,
 H. F. Rampton.